United States Patent
Yoshida

Patent Number: 6,101,611
Date of Patent: Aug. 8, 2000

[54] PORTABLE TERMINAL HAVING CONTROLLER FOR JUDGING REMAINING CAPACITY OF A BATTERY AND FOR CONTROLLING THE SUPPLY OF POWER IN RESPONSE TO A DRIVE REQUEST AND METHOD RELATED TO SAME

[75] Inventor: Kenichi Yoshida, Tokyo, Japan

[73] Assignee: NEC Corporation, Tokyo, Japan

[21] Appl. No.: 08/922,908

[22] Filed: Sep. 3, 1997

[30] Foreign Application Priority Data

Sep. 3, 1996  [JP]  Japan ..................... 8-232787

[51] Int. Cl.⁷ ........................... G06F 1/26
[52] U.S. Cl. ............... 713/340; 713/330; 713/310; 320/132
[58] Field of Search ............... 395/750.02, 750.05, 395/750.06, 750.07, 750.08; 320/132, 158, 148–149, 48–49

[56] References Cited

U.S. PATENT DOCUMENTS

| | | | |
|---|---|---|---|
| 5,581,772 | 12/1996 | Nanno et al. ............... | 395/750.01 |
| 5,694,607 | 12/1997 | Dunstan et al. ............ | 395/750.01 |
| 5,752,046 | 5/1998 | Oprescu et al. ............ | 395/750.01 |
| 5,796,239 | 8/1998 | Van Phuoc et al. ........ | 320/107 |
| 5,802,379 | 9/1998 | Boatwright et al. ........ | 395/750.06 |
| 5,809,310 | 9/1998 | Fukuda et al. ............. | 395/750.01 |
| 5,809,316 | 9/1998 | Gouzu ......................... | 395/750.05 |
| 5,822,600 | 10/1998 | Hallowell et al. .......... | 713/340 |
| 5,883,497 | 3/1999 | Turnbull ..................... | 320/132 |

*Primary Examiner*—Ayaz R. Sheikh
*Assistant Examiner*—Raymond N Phan
*Attorney, Agent, or Firm*—Ostrolenk, Faber, Gerb & Soffen, LLP

[57] ABSTRACT

When a judgment request is output, a judging means outputs a remaining battery capacity calculation request F, in response to which a remaining capacity calculating means outputs a request for detection of the voltage, which is required to calculate the remaining battery capacity. In response to this voltage detection request, a voltage detection means detects the voltage of a power supply, and output the result of this voltage detection.

In response to this voltage detection result, the remaining battery capacity calculating means calculates the remaining battery capacity, and outputs the results of this calculation, in response to which a judging means judges whether or not there is sufficient power supply capacity remaining for operation with respect to a startup request, and outputs a judgment result. If this judgment result was that execution is possible, an execution means executes the requested operation.

20 Claims, 13 Drawing Sheets

Fig. 9
(A)
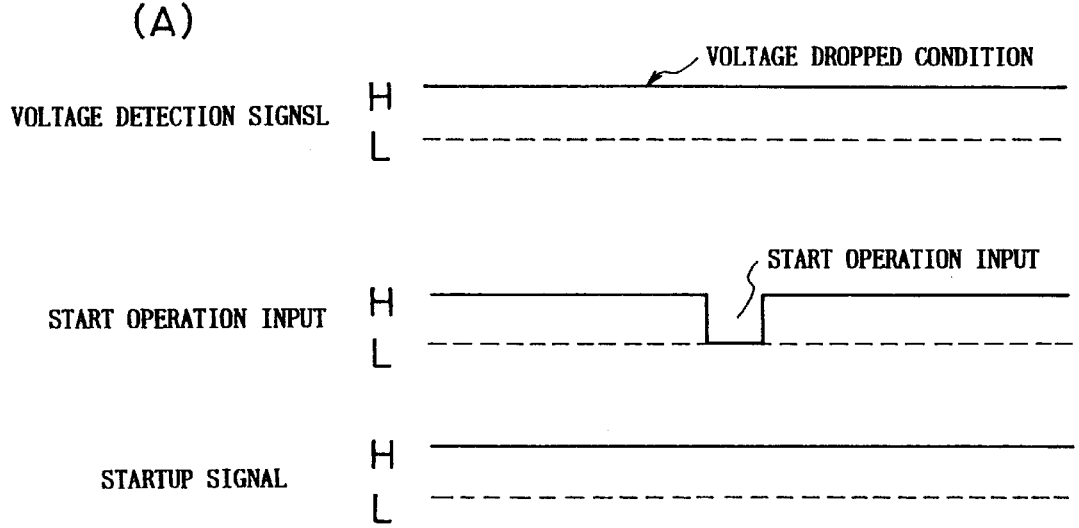
(B)
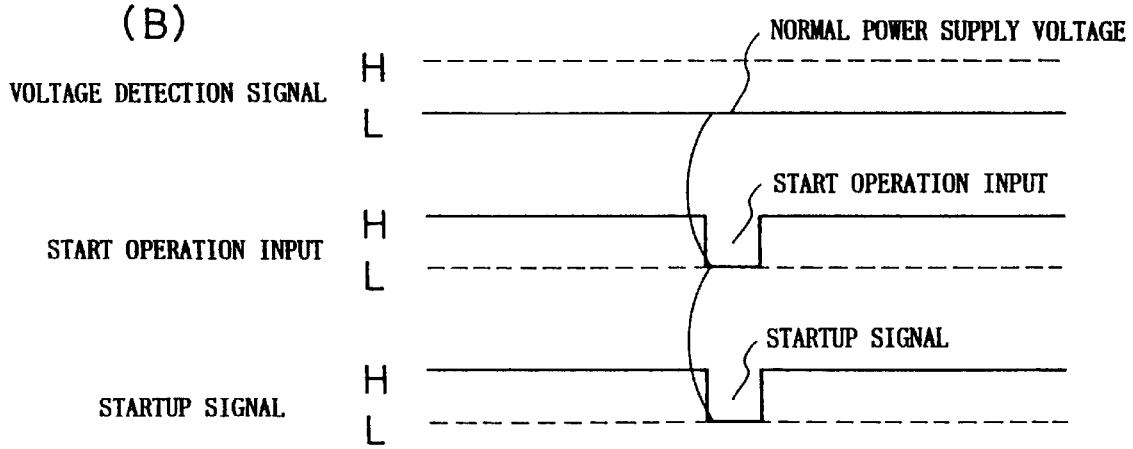

PORTABLE TERMINAL HAVING CONTROLLER FOR JUDGING REMAINING CAPACITY OF A BATTERY AND FOR CONTROLLING THE SUPPLY OF POWER IN RESPONSE TO A DRIVE REQUEST AND METHOD RELATED TO SAME

BACKGROUND OF THE INVENTION

1. Field of the Invention

The present invention relates to portable terminal that uses a battery as a power supply and to a method for controlling peripheral circuits in portable terminal.

2. Description of Related Art

In this type of portable data terminal such as disclosed, for example, in Japanese Unexamined Patent Publication (KOKAI) No. 61-86877, when the power supply voltage drops or when a power supply is connected having a voltage that has dropped, faulty operation by stored data or a program is prevented by preventing the start of operation, and stored of data or a program is protected from being destroyed.

FIG. 8 shows an example of the configuration of this type of prior art.

In this drawing, reference numeral 85 denotes a power supply voltage detection means, this being connected to a controller 86 and a starting signal control means 87, and 88 is a starting signal outputting means, which is connected to the starting signal control means 87. The starting signal control means 87 is connected to the controller 86. While the reference numeral 89 denotes a memory section, which is connected to the controller 86.

The operation of the above-noted example will now be described.

In the configuration of FIG. 8, when the power supply voltage drops, the power supply voltage detection means 85 outputs a detection signal 81 to the controller 86 and to the starting signal control means 87.

When this detection signal changes to the high level, the controller 86 judges that the power supply voltage has dropped, and notifies the operator of this event. The controller 86 also stops operation.

When the detection signal changes to the high level, that is, when the power supply voltage drops or a power supply is connected that has a voltage that has dropped, if there is an input from the operator to start operation, a start signal (low level) is output from the start signal outputting means 88 to the start signal control means 87.

When this happens, because the detection signal is input from the power supply voltage detection means 85, the start signal control means 87 does not output a start signal 83 to the controller 86.

When the power supply voltage is normal (when it reaches the reference voltage), and when there is an input from the operator to start operation, the start signal 83 is output from the start signal outputting means 88 to the controller 86, via the start signal control means 87.

This start signal control is shown in FIG. 9.

FIG. 9(A) shows the start signal control in the case in which the power supply voltage drops or in which a power supply is connected which voltage has dropped, while FIG. 9(B) shows the starting signal control in the case in which the power supply voltage is normal.

In the prior art, because the starting signal control depends upon whether or not the power supply voltage is a voltage at which normal operation is possible, when the power supply voltage drops or when a power supply is connected which voltage has dropped, even if the operator makes an input to start operation the terminal will not occur, offering the advantage of protecting stored data and programs.

The configuration of the power supply lines in the past is shown in FIG. 10.

The configuration shown in FIG. 10 is formed by a power supply 101 which is indicated as a battery, a voltage raising means, such as a booster or the like, 102 for the purpose of boosting the voltage so as to supply a constant voltage, a control means 103 which controls the switching means 104 and 105, switching means 104 performing on/off switching of the supply of power to a peripheral circuit 106, and switching means 105 performing on/off switching of the supply of power to a peripheral circuit 107, and peripheral circuit 106 and peripheral circuit 107 starting and operating only when they are supplied with electrical power.

In a portable terminal such as a terminal that is carried about, a battery is usually used as the power supply.

Because a battery is not capable of supplying a stabilized voltage to at all times with a varying supply current, a voltage raising means 102 is used to stabilize the supplied voltage.

For this reason, while the voltage on the power supply line A varies, there is almost no variation on the power supply line B.

In a portable terminal, to extend the limited life of a battery as much as possible, the supply of power to a circuit that is not being used is stopped.

The control means 103 judges whether or not the peripheral circuits 106 and 107 are being used and, if they are not being used, stops power supply thereto by means of the switching means 104 and 105.

Because on/off control of the power supply to the peripheral circuits 106 and 107 must be performed by the control means 103, it must always be supplied with power, via power supply line B.

FIG. 11 shows the transitions of voltage supply conditions on the power supply lines shown in the above-noted power line configuration drawing, the transition of the voltages after the switching means, these being the transition of the supply condition of the voltages C and D as shown in FIG. 10, occurring before transition of the voltage after the voltage boosting means, which is the transition of the voltage B as shown in FIG. 10.

In this drawing, the horizontal axis represents time, and this drawing represents the passage of time from a to d.

In terms of the example of the switching of the voltage supplied to the peripheral circuit 106, at time a the supply of electrical power to the peripheral circuit 106 begins.

At this point, because there is a sudden flow of current into the peripheral circuit 106, there is a drop in the voltage on the power supply line C.

In a circuit having a storage means such as a capacitor, because the capacitor begins storage when the supply of power thereto is started, this causes a sudden flow of current.

For this reason, the voltage drops temporarily. This voltage drop passes through the switching means 104 and propagates to the voltage raising means 102, so that a delay occurs, after which the voltage on power supply line B drops.

This drop in voltage is detected, and the voltage boosting means 102 increases the amount of current supplied, thereby stabilizing the voltage.

At time c, the power supply line B is stable. Because of this stabilized power supply line B, the power supply line C is also stabilized.

However, because there is propagation via the switching means 104, a delay will be continued until the time d occurs.

Also, in the case in which a circuit is started which suddenly consumes a large amount of power, the same type of phenomenon as described above occurs, independent of the start of application of power.

Thus, when starting to supply power to a circuit, and when starting circuit with a large power consumption, a temporary voltage drop occurs.

On the other hand, the Japanese Unexamined Patent Publication (KOKAI) No. 1-95065 shows a portable terminal device by which the power consumption of a battery will be reduced.

More over, the Japanese Unexamined Patent Publication (KOKAI) No. 4-160415 also shows a portable terminal having a control circuit by which the power consumption of a battery will be reduced.

However, in these conventional technologies, a specific circuit so as to reduce the power consumption of the battery is introduced into these portable circuit but these documents fail to show or suggest the technical conception that the remaining voltage capacitance is used for controlling to execute a plurality of peripheral circuits, taking each of sufficient power voltage by which the respective peripheral circuit can work normally, into the account.

A first problem occurring in the prior art is that, even in the case in which the amount of remaining battery capacity is insufficient at times other than start-up, the operation of a circuit which consumes a large amount of power causes a drop in voltage, this leading to the possibility of faulty operation.

The reason for this is that, although the battery itself might have insufficient capacity, it might be capable of causing operation of a circuit with low power consumption. When the supply of current to a circuit is started, because of the temporary flow of a large amount of current, there is a temporary drop in the voltage supplied to the circuit.

A second problem occurring in the prior art is that, although a circuit might itself have a low power consumption, if supply is started to a number of such circuits simultaneously, or if a number of these circuits are started simultaneously, the voltage can drop, leading to the possibility of faulty operation.

The reason for this is that, when using one application, there are cases in which a number of peripheral circuits should be used.

In such cases, when using an application, it can begin to start the supply of power to a number of peripheral circuits simultaneously.

A third problem occurring in the prior art is that, because of the large power consumption of the voltage detection circuit, in a portable terminal which uses a battery as a power supply, the power consumption there of is excessively large.

The reason for this is that, to enable accurate voltage detection in the voltage detection means, an A-D (analog-digital) converter is required. The A-D converter requires a sampling clock, and the oscillation of this clock consumes electrical power.

A fourth problem is that, in the case of a mere temporary restoration of the battery voltage, there is a possibility that startup and faulty operation will occur.

The reason for this is that if a battery with little remaining capacity is used without a load or with a small load, there is a temporary restoration to a supply of the normal voltage.

An object of the present invention, is to prevent faulty operation in a portable terminal in which the power supply voltage has dropped, and to prevent the destruction of data and a program by such faulty operation.

Another object of the present invention is, in the case in which the above-noted faulty operation occurs, to prevent the terminal from being left in this faulty operating condition, and to prevent the backup battery of the terminal to be consumed in this faulty operating condition, thereby preventing the total loss of a stored program or data.

Yet another object of the present invention is, in the case of the startup of the terminal when the operator is not present, to prevent the above-noted faulty operation, and to prevent the consumption of even the backup battery of the terminal without applying any form of countermeasure, thereby preventing the total loss of a stored program or data.

SUMMARY OF THE INVENTION

To attain the objects of the present invention as described above, the portable terminal and a method for controlling the peripheral circuits as used in the portable terminal basically have the following technical conceptions.

The first aspect of the present invention is a portable terminal having a battery, a plurality of peripheral circuits, and a control means for individually controlling the supply of power to the peripheral circuits in response to an external drive request, the terminal comprising, a voltage detection means for detecting a voltage of the battery in response to a voltage detection request supplied from the control means in response to the drive request, and the control means comprising a judging means which judges the remaining capacity of the battery based on a voltage detected by the voltage detection means, and which further makes a judgment as to whether or not there is sufficient remaining capacity to satisfy the drive request, and wherein in the case in which a judgment result of the judging means is positive, the control means causes the battery to supply power in response to the drive request.

The second aspect of the present invention is a method for controlling to execute a plurality of peripheral circuits used in a portable terminal having a battery, a plurality of peripheral circuits, and a control means for individually controlling the supply of power to the peripheral circuits in response to an external drive request. The method comprises the steps of, detecting a voltage of the battery in response to a current battery voltage level detection request supplied from the control means in response to the drive request, calculating a remaining capacity of the battery based on the detected voltage, judging whether or not there is sufficient remaining capacity to satisfy the drive request, based upon the calculated remaining capacity of the battery, and supplying power to one or more than one of selected peripheral circuits each corresponding to the drive request when a result of the judgment is positive.

In accordance with the portable terminal of the present invention, when an application is started, a portable terminal of the present invention detects the current voltage level of a battery used in the portable terminal or calculates the current remaining battery capacity thereof calculated depending upon the detected current voltage, and enables to start one or more than one of the peripheral circuits to be used for executing the applications, based the judgment on this detected voltage or calculated remaining battery capacity.

More specifically, the present invention has a voltage detection means which detects the voltage of a battery which serves as the power supply, a remaining battery calculation means which calculates from the voltage value the amount of remaining battery capacity, and a judging means which makes a judgment as to whether or not the application can be started.

When an application starting request is issued, a battery voltage detection request is issued.

The battery voltage is detected, the amount of remaining battery capacity being calculated from the voltage value resulting from that detection.

From the calculation results, a judgment is made as to whether or not there is enough electrical energy to supply current for the application if power is supplied to the circuit to be started.

For this reason, if the amount of remaining battery capacity is small, it is possible to make a judgment before starting an application that consumes a large amount of electrical power and to stop this, thereby enabling prevention of a voltage drop caused by insufficient remaining battery capacity, and enabling prevention of faulty circuit operation.

BRIEF DESCRIPTION OF THE DRAWINGS

FIGS. 9(A) and 9(B) are control timing charts showing the prior art.

DETAILED DESCRIPTION OF THE PREFERRED EMBODIMENTS

The preferred embodiment of the present invention will be explained with reference to the attached drawings, hereunder.

Figure 2:
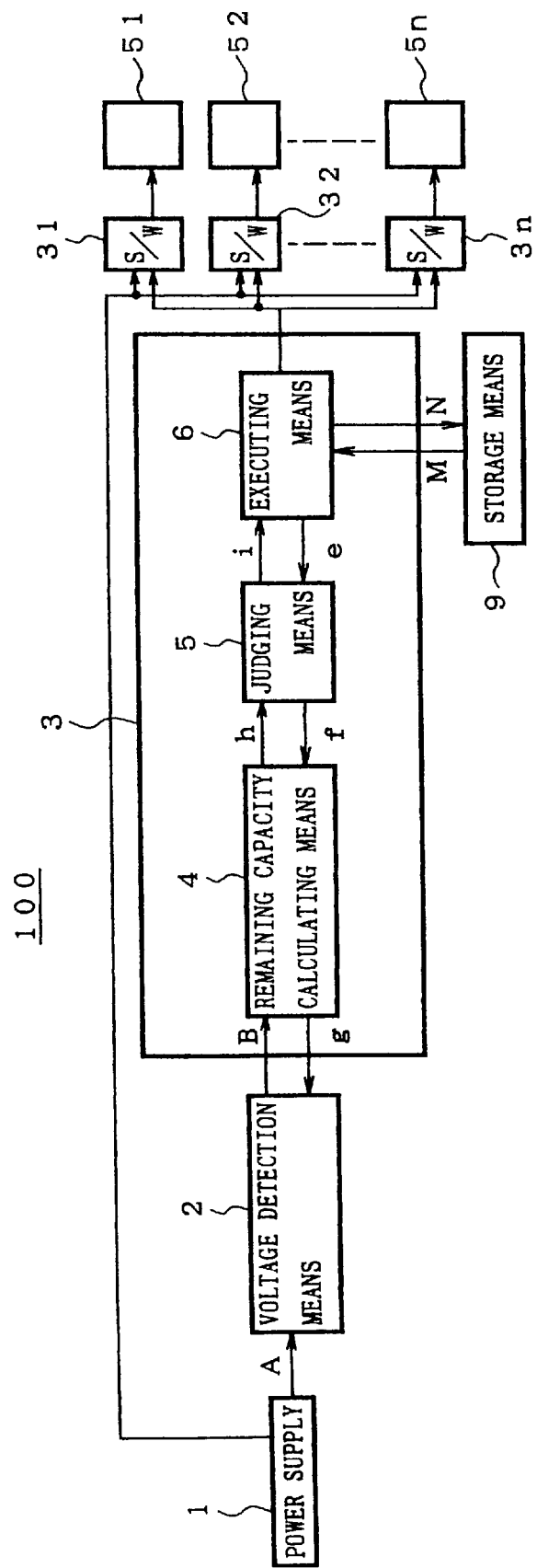
FIG. 2 is a system configuration diagram of the present invention.

FIG. 2 shows one embodiment of the portable terminal 100 of the present invention and in which it is explained that a portable terminal 100 having battery 1, a plurality of peripheral circuits 51, 52, - - - 5n, and a control means S for individually controlling the supply of power to the peripheral circuits 51, 52, - - - 5n, in response to an external drive request, the terminal 100 comprising, a voltage detection means 2 for detecting a voltage of the battery 1 in response to a voltage detection request or a remaining battery capacity detection request supplied from the control means 3 in response to the drive request, and the control means 3 comprising a judging means 5 which judges the remaining capacity of the battery 1 based on a voltage detected by the voltage detection means 2, and which further makes a judgment as to whether or not there is sufficient remaining capacity to satisfy the drive request, wherein the case in which a judgment result of the judging means 5 is positive, the control means 3 causes the battery 1 to supply power in response to the drive request.

Note that, when the portable terminal 100 is operated, the control circuit 3 may be operated by an operator by pushing a suitable start-up key not shown in FIG. 2.

Figure 1:
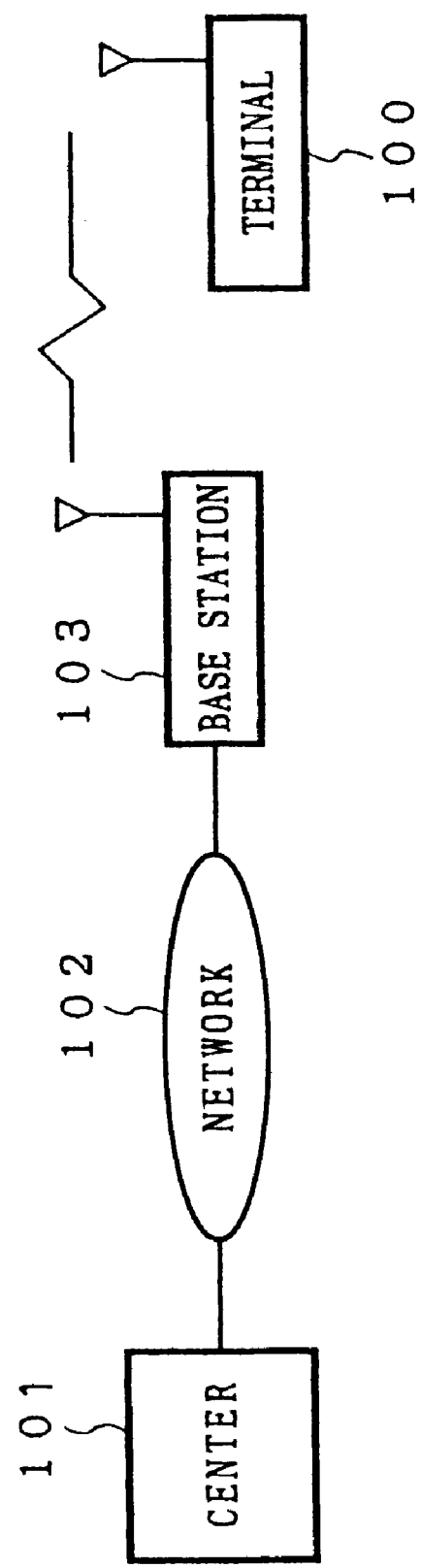
FIG. 1 is a network diagram of a portable terminal in use.

Turning to FIG. 1, we see a drawing which illustrates the general method of using a portable terminal 100 in a network configuration.

FIG. 1 shows the system to consist of a center 101, a network 102, a base station 103, and a terminal 100.

The center 101 performs management of wired and radio services, and is connected to each base station 100 by means of the network.

The base stations 103 perform transmission of information from the center 101 to various terminals 100 by either a radio signal or over cables (wires).

The center 101 has a database, enabling access and storage of various types of data from a terminal 100.

The first embodiment of the portable terminal 100 will be more precisely explained and its operation will be explained hereunder.

As shown in FIG. 2, the portable terminal 100 of the present invention comprises, for example, a power supply 1 which is a portable power supply such as a battery, a voltage detection means 2 which detects the voltage and operates only when there is a voltage detection request, a remaining capacity calculating means 4 which calculates, from the voltage value B resulting from the voltage detection means 2, a judging means 5 which makes a judgment, from the results h of the remaining capacity calculating means 3, as to whether or not the application can be started, an executing means 6 which executes the actual operation, and a storage means 9 which stores data, programs, and the like.

The above noted remaining capacity calculating means 4, the judging means 5, and the executing means 6 form a controller 3.

One embodiment of the operation in the portable terminal of the present invention will now be described with reference to FIG. 7.

Figure 7:
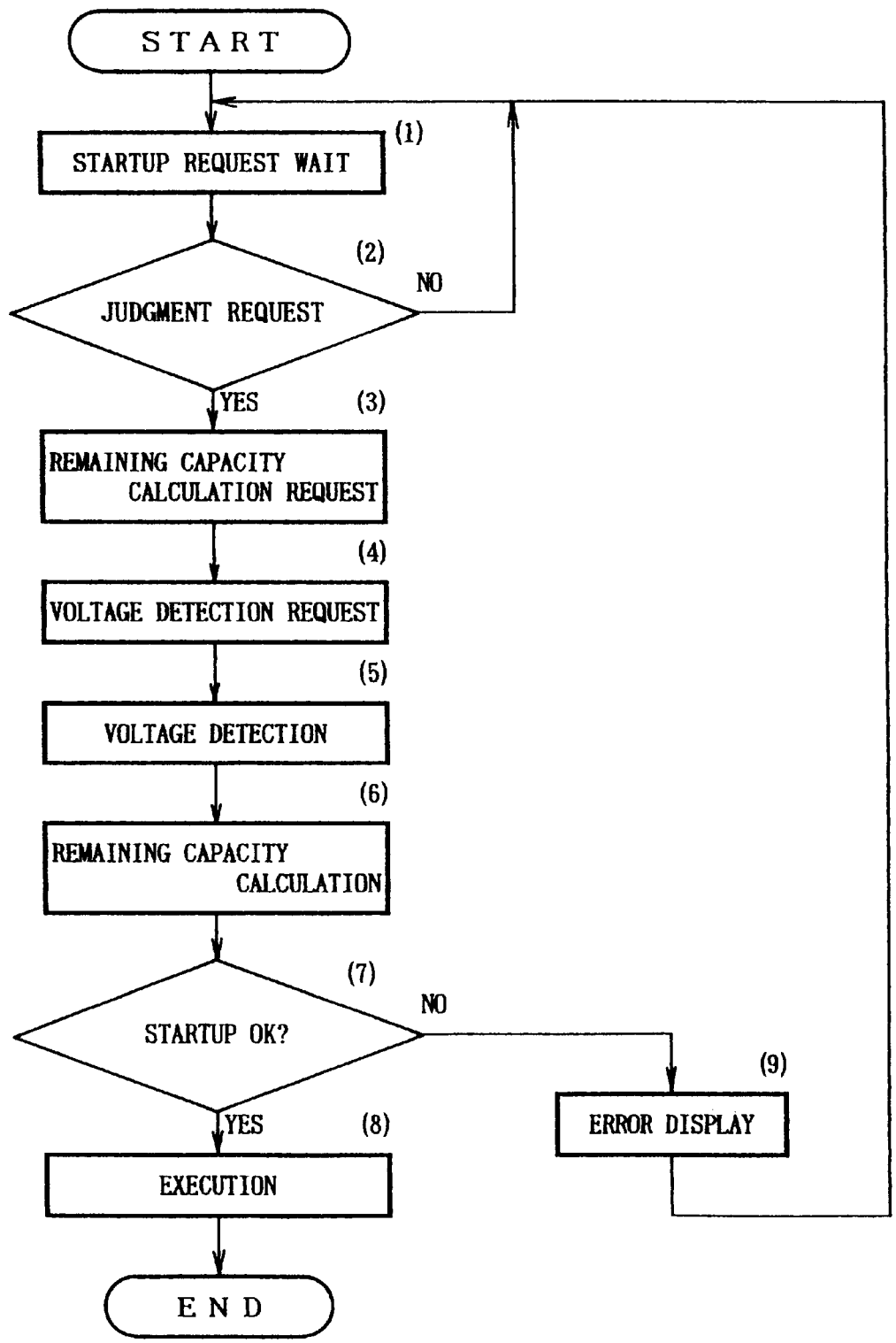
FIG. 7 is a system operation flowchart of the present invention.
Figure 8:
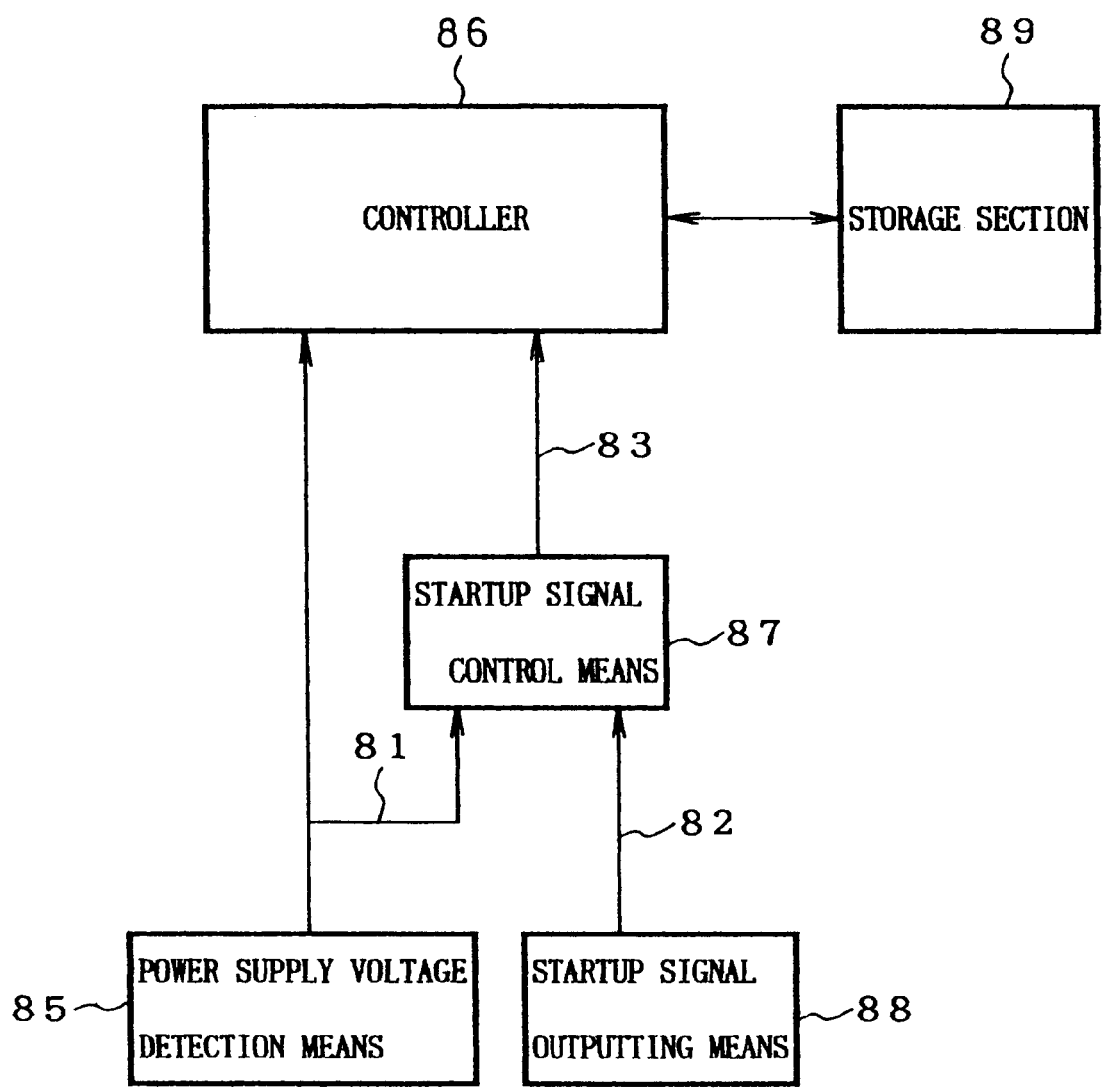
FIG. 8 is a drawing which shows the configuration of the prior art.

FIG. 7 shows a system flowchart for a portable terminal 100 according to the present invention. The operating of the system illustrated in FIG. 2 will be explained, following the flowchart of FIG. 7.

First, after START, in the step (1), the executing means 6 is in the startup request wait condition.

In the step (2), it is determined that whether or not a judgment request e is output from the executing means 6, and if the answer is NO, then the process will be returned to the step (1) and repeats the same operation as mentioned above. If when the answer is YES in the step (2), then go to the step (3) and the judging means 5 outputs a remaining capacity calculation request f to the remaining capacity calculating means 4.

Then, in the step (4), the remaining capacity calculating means 4 outputs the voltage detection request signal g is output to the voltage detection means 2 in response to remaining capacity calculation request f and thereafter the voltage detection means 2 detects the voltage A of the power supply 1 and outputs the voltage detection result B, in the step (5).

Thereafter, the process goes to the step (6), the remaining capacity calculating means 4 performs a calculation, from the voltage detection results B, of the remaining amount, and outputs the remaining capacity calculation result h.

Next, the process goes to the step (7), the judging means 5 makes a judgment, from this remaining amount result h, as to whether or not the operation requested to be started can be operated by the current remaining capacity of the power supply 1, and if the answer is YES, then go to the step (8) and the judging means 5 outputs the judgment result i to the executing means 6 and then the process ends.

On the other hand, when the answer is NO, in the step (7), then the process goes to the step (9) and error is displayed at a suitable display means and goes back to the step (1) and the above-mentioned steps will be reiterated.

In the step (5), in the case under which the judging means 5 can make a judgment only by the detected current voltage of the battery, then the process may skip the step (6) and directly may move to the step (7).

In the above-mentioned flowchart, in the step (7), if the judgment result i indicates that execution is possible, the execution means 6 executes the requested operation.

If execution was not possible, however, an error display to the effect that execution is not possible is made, thereby notifying the operator that the currently requested operation could not be executed with the current remaining power supply capacity.

When it is possible to accurately calculate the amount of time that the currently requested operation can be used, the operator is notified of this time, and a request is made for instruction as to whether or not to use that operation.

As explained above, in the present invention, the judging means 5 can make the judgement as to whether or not a certain peripheral circuit or a plurality of the peripheral circuits should be supplied with the power from the battery either one of the detected current voltage level of the battery and the calculated remaining capacity of the battery.

Accordingly, the control means 3 may directly ask the voltage detection means 2 or may ask the voltage detection means 2 through the remaining capacity calculating means 4.

Note that, for example, if an accurate currently remaining capacity of the battery at the exact time should be required when the judgment is required in that how long the battery can work effective from now on or which peripheral circuit out of a plurality of the peripheral circuits should be selected, the remaining capacity calculating means 4 is preferably used.

Therefore, in the present invention, the control means 3 may further comprise a remaining capacity calculating means 4 for calculating a remaining capacity of the battery 1 based on a voltage detected by the voltage detection means 2 and a judging means 5 which makes a judgment as to whether or not there is sufficient remaining capacity to satisfy the drive request, based upon the data output from the remaining capacity calculating means 4.

On the other hand, in another embodiment of the present invention, the control means 3 may comprise a remaining capacity calculating means which calculates, from the voltage value resulting from the voltage detection means 2; a judging means 5 which makes a judgment, from the results of the remaining capacity calculating means 4 or the voltage detection means 2, as to whether or not the application can be started or whether or not there is sufficient remaining capacity to satisfy the drive request, and an executing means 6 which executes the actual operation, such as to control each one of the peripheral circuits.

In the present invention, the executing means preferably comprises a switching controlling means for at least one switching means 104, 105 for controlling an operation of each one of the peripheral circuits 106, 107.

In the present invention, when the judgment is that execution is possible, if a plurality of peripheral circuits are to be started simultaneously, it is preferred that the power should be supplied to all of the peripheral circuits sequentially, rather than supplying same to all the peripheral circuits at once.

In another embodiment of the present invention, when the judgment is carried out by the judging means 5, the judging means 5 may select one or more than one of the peripheral circuits out of the total number of the peripheral circuits which should be or preferably executed simultaneously in carrying out a certain application or the like, based upon the detected current voltage level of the battery or the calculated currently remaining capacity of the battery.

Figure 10:
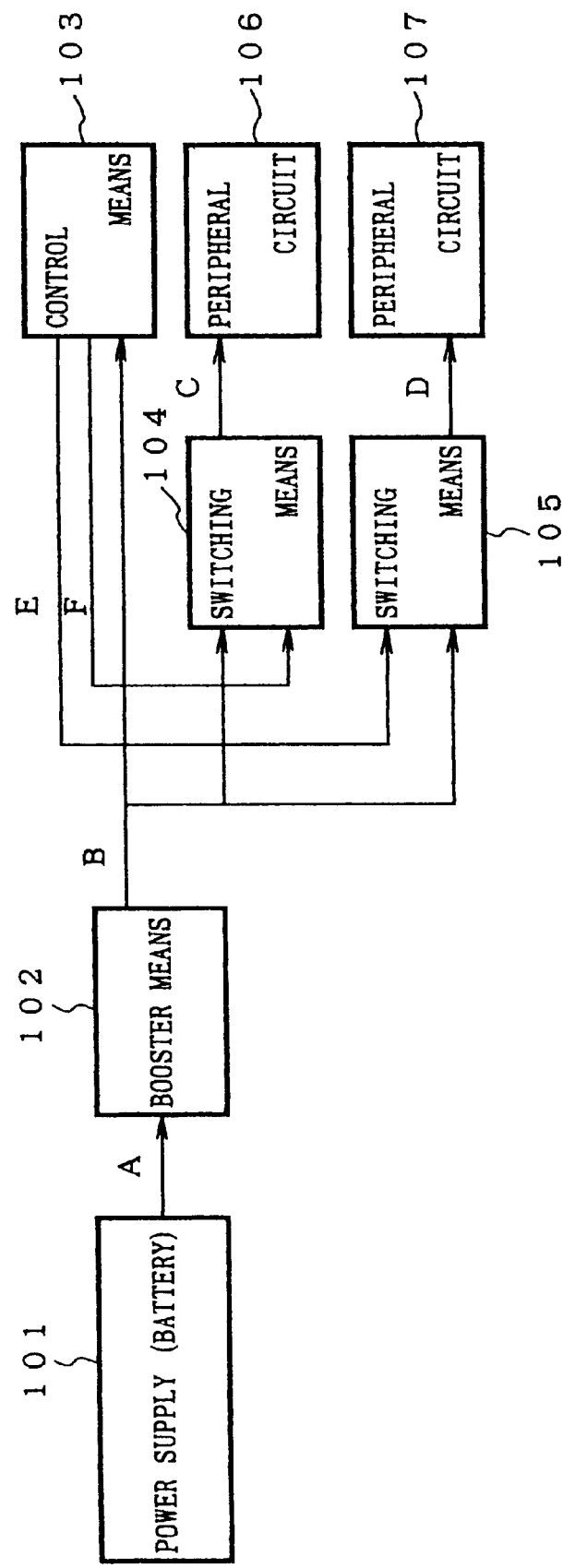
FIG. 10 is a block diagram which shows the power line configuration in the prior art.

As described with regard to the prior art, with reference to FIG. 10, by normally not supplying power to peripheral circuits that are not being used in a portable terminal, a savings in electrical power is achieved.

In a portable terminal configured in this manner, there are cases in which a plurality of peripheral circuits are used simultaneously when using a single application.

Figure 11:
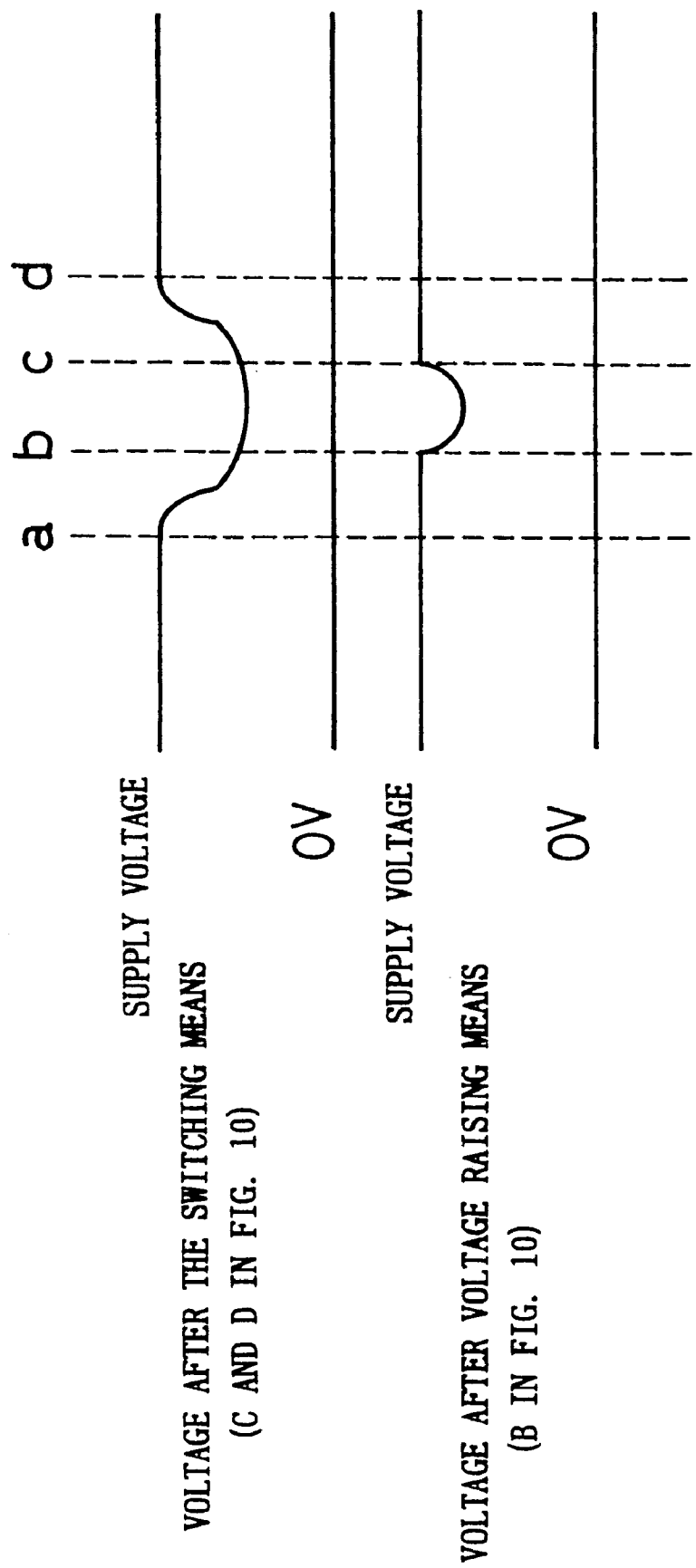
FIG. 11 is a state transition diagram which shows the power line voltage supply states in the prior art.

As described with regard to the prior art shown in FIG. 11, when the supply of electrical power to a peripheral circuit is started, there is a possibility that a temporary drop in voltage will occur.

However, when a certain period of time has elapsed, after the time shown in FIG. 11, the power supply line becomes stable.

For this reason, in the case in which a plurality of peripheral circuits is used, the supply of power is first started to one of the peripheral circuit, after which verification of voltage stability is performed by the voltage detection means 2 and, if the voltage is stable, electrical supply is sequentially applied to the other peripheral circuits in turn.

By doing this, it is possible to prevent a drop in voltage and to prevent runaway circuit operation which can occur when a large number of peripheral circuits having even small electrical power consumption are started simultaneously.

Further in the present invention, a construction of the voltage detection means is not restricted to a certain construction, for example, an A/D Converter or the like but any kinds of construction thereof can be used for this voltage detection means.

For example, it may comprise a voltage comparator having a suitable level of reference voltage to be compared and the reference voltage thereof can be set at an optional level taking into account a minimum voltage level with which each one of the specific peripheral circuits as used in this portable terminal can effectively and correctively operate.

Figure 13:
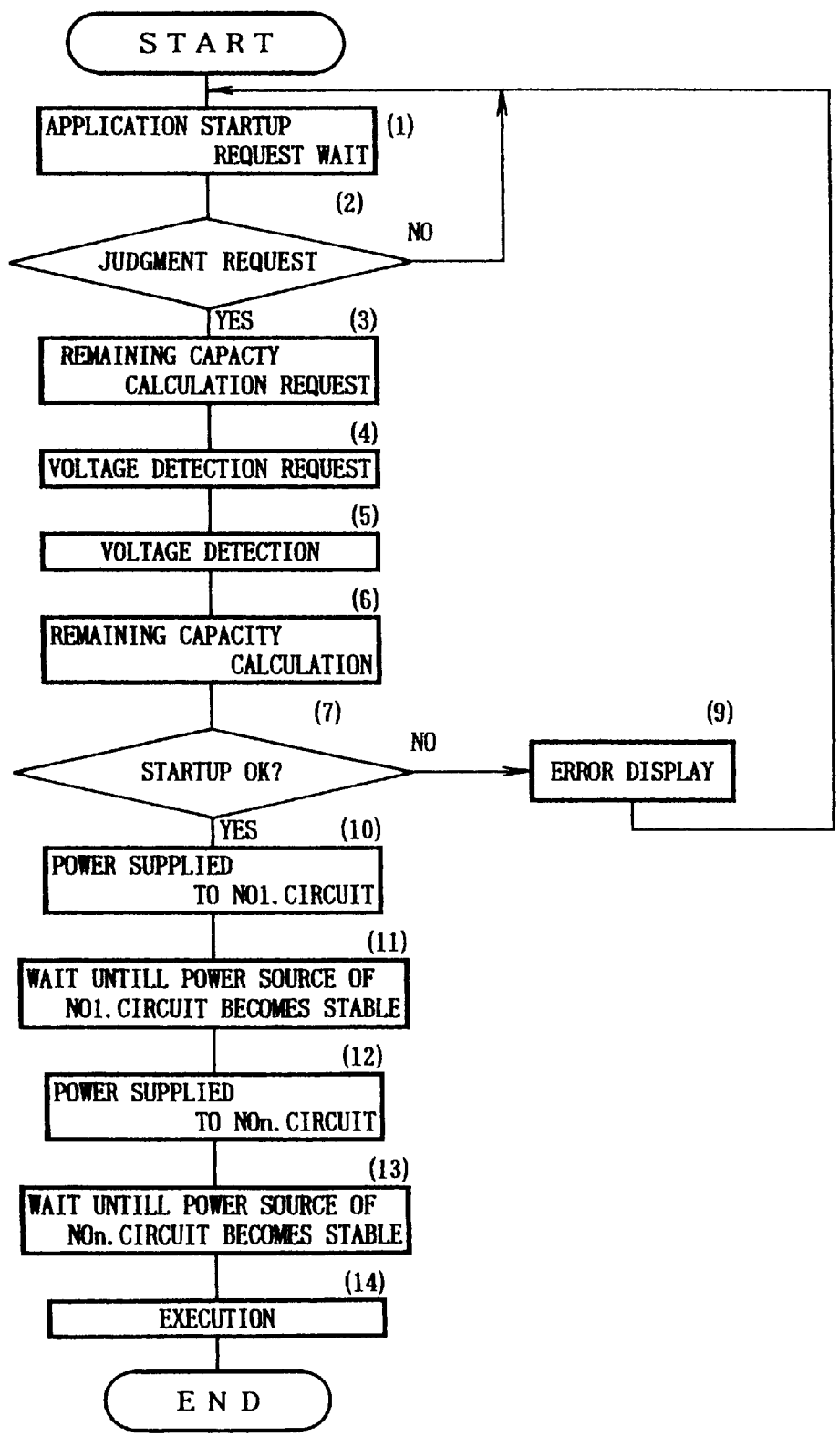
FIG. 13 is a system operation flowchart of the another embodiment of the present invention.

FIG. 13 shows another flowchart indicating one example of the operation sequence in which the above-mentioned embodiment will be carried out.

Note that, the process sequence shown by the step (1) to the step (7) are identical to those as described in FIG. 7 and thus the explanations thereof are omitted.

However, in the step (7), when the answer is YES, then the process goes to the step (10) and a first peripheral circuit (51) is supplied with power then the process goes to and in the step (11), and wait for a while until the power supplied to the first peripheral circuit (51) will become stable.

After that the process goes to the step (12) and the next peripheral circuit, for example, a second peripheral circuit (52) is supplied with power then the process goes to and in the step (13), and wait for a while until the power supplied to the next peripheral circuit, for example, a second peripheral circuit (52) will become stable.

Then, the steps (12) and (13) will be repeated until all of a predetermined number of peripheral circuits (51 to 5n) are supplied with the power and after when the above-mentioned fact has been confirmed, the process goes to the step (14) and start to execute the certain application as required.

Next, the second embodiment of the present invention will be described with reference being made to the relevant drawings.

Figure 3:
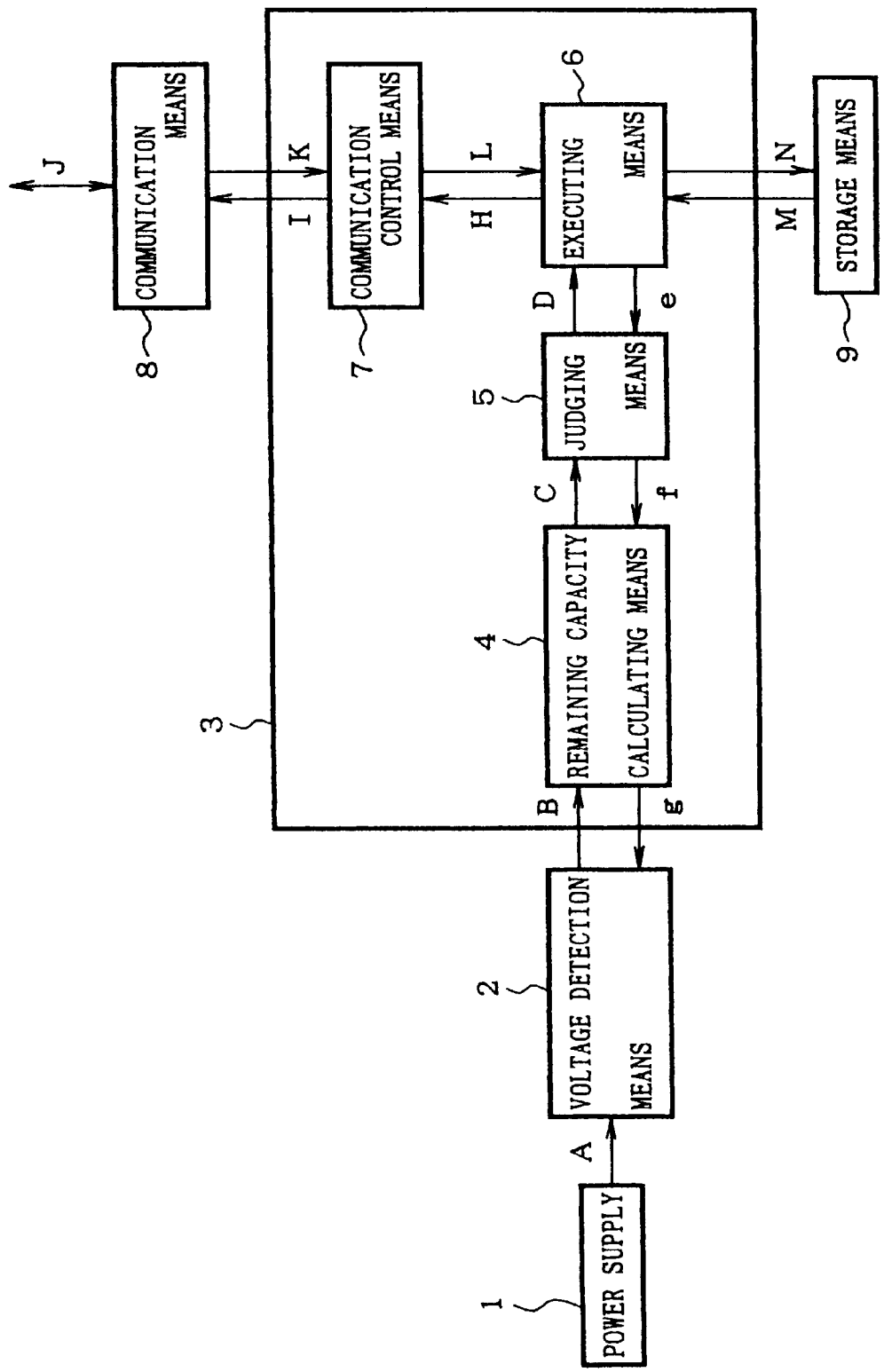
FIG. 3 is a system configuration diagram which shows the present invention used in a network.

FIG. 3 shows the configuration in the case in which the terminal of FIG. 2 is used in the network of FIG. 1.

The system shown in FIG. 3 has a power supply 1 which is a portable power supply such as a battery, a voltage detection means 2 which detects the voltage and operates only when there is a voltage detection request, a remaining capacity calculating means 4 which calculates, from the voltage value B resulting from the voltage detection means 2, a judging means 5 which makes a judgment, from the results h of the remaining capacity calculating means 4, as to whether or not the application can be started, an execution means 6, a communications control means 7 which performs control when performing communication with the base station in FIG. 1 or with a network, and a communication means 8 which performs actual communication.

The above-noted remaining capacity calculating means 4, the judging means 5, the executing means 6, and the communication control means 7 form a controller 3.

Next, the operation of this embodiment of the present invention will be described.

Basic operation either of the embodiment as shown in FIG. 2 or as shown in FIG. 3, is performed in accordance with the flowchart shown in FIG. 7, which can be used to describe the operation of both embodiments.

However, with the communication means used with a network, there is the cases in which the execution means 6 operates by a starting request for a data transfer application, and the case in which the executing means 6 operates in response to the issuance of a data receiving request to the execution means 6 by the communication control means 7 because of the detection of received data by the communication means 8.

In the case in which a data transfer application issues a startup request, the operation follows the flowchart of FIG. 7 which was used in the description of operation in FIG. 2.

The case in which a startup request occurs because of the detection of received data will be described next.

When the communication means 8 detects a data transfer request J from the network, it sends the same signal K to the communication control means 7.

Then, the communication control means 7 issues a data receiving request L to the execution means 6.

The execution means 6 issues a judgment request e to the judging means 5

When the judgment request e is output, the judging means 5 outputs a remaining capacity calculation request f, and then the remaining capacity calculating means 4 outputs a request g for the detection of the voltage, which is required for calculating the amount of remaining capacity in response to the remaining capacity calculation request f.

In response to the voltage detection request g, the voltage detection means 2 detects the voltage A of the power supply 1, and outputs the voltage detection result B.

In response to the voltage detection result B, the remaining capacity calculating means 4 performs a calculation of the remaining amount, and outputs a remaining amount calculation result h.

In response to this remaining amount calculation results h, the judging means 5 performs a judgment as to whether or not, with the current amount of power supply capacity, it is possible to perform the operation that was requested to be started, and outputs a judgment result i.

In response to the judgment result i, if the judgment was that execution is possible, the execution means 6 outputs an execution possible result H to the communication control means 7, in response to which the communication control means 7 outputs a data receiving request I to the communication means 8.

If, however, the result was the execution is not possible, an error display to the effect that execution is not possible is made, thereby notifying the operator that the currently requested operation could not be executed with the current remaining power supply capacity.

Simultaneously with this, in response to the communication not possible result, the communication control means 7 outputs a data receiving stop command I to the communication means 8.

When it is possible to accurately calculate the amount of time that the currently requested operation can be used, the operator is notified of this time, and a request is made for instruction as to whether or not to use that operation.

Next, the third embodiment of the present invention will be described in detail, with reference being made to the relevant drawings.

Figure 4:
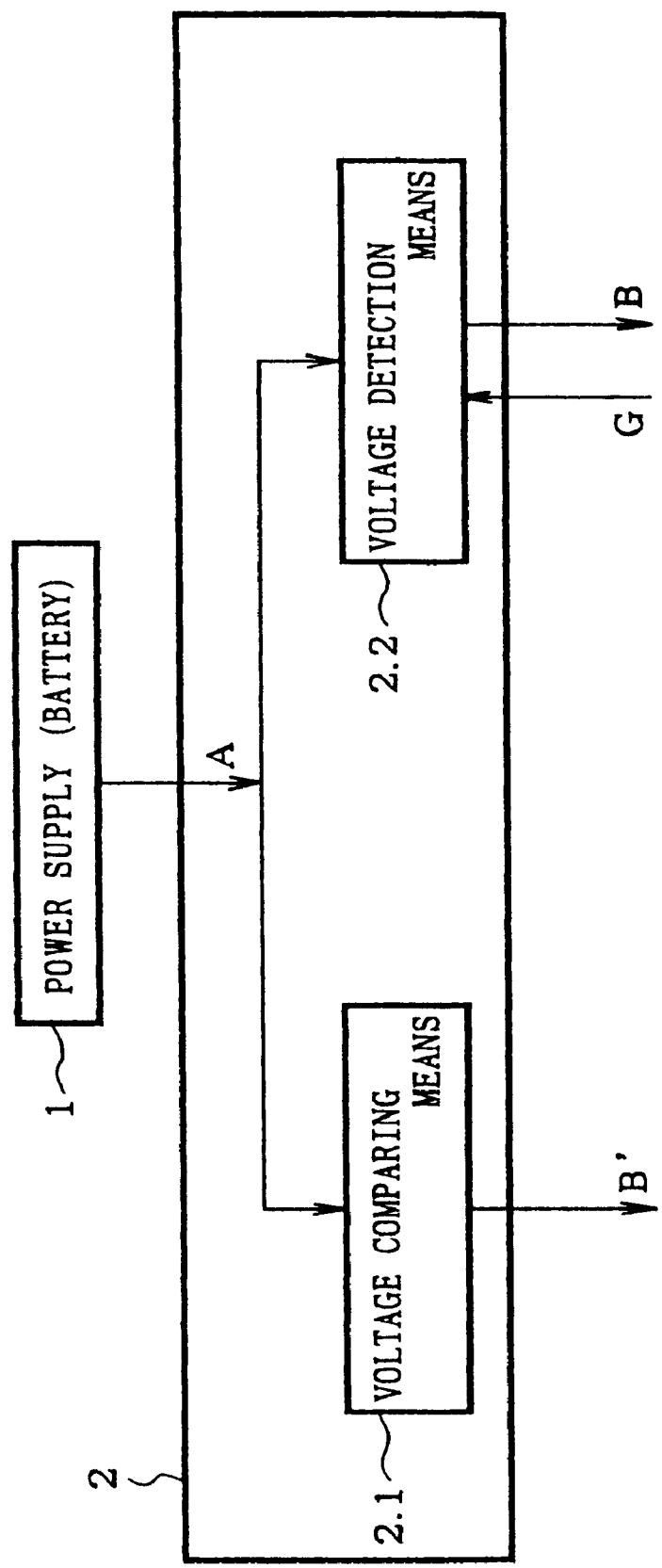
FIG. 4 is a drawing which shows a first example of the configuration of the voltage detection means of the present invention.

FIG. 4 shows an example of the configuration of the voltage detection means in FIG. 2 and FIG. 3.

As shown in FIG. 4, this is formed by a power supply 1 which is a portable power supply such as a battery, a voltage detection means 2.2 which has been used also in the prior art, and a voltage comparing means 2.1 which compares the power supply voltage with a predeterminedly set voltage.

The part 2 which is formed by the voltage detection means 2.2 and the voltage comparing means 2.1 serves as the voltage detection means 2 which is shown in FIG. 2 and FIG. 3.

The voltage detection means 2.2 operates in response to a voltage detection request g from the control means 3, and performs a detection of the voltage of the power supply 1.

When there is no voltage detection request, it does not operate.

In the earlier-described prior art, it was clearly indicated that a voltage detection request to the voltage detection means 2.2 was issued when a terminal is started up.

In this system, even after a terminal is started up, it is possible to detect the voltage at any time, in response to a request from an application.

In this case, however, unless the terminal is started and it is possible to start the application, the voltage detection means 2.2 does not operate.

The voltage comparing means 2.1 makes a judgment as to whether or not the voltage being sufficient to start the terminal is supplied to the peripheral circuits.

The voltage that this voltage comparing means is to compare, is a characteristic value with respect to each one of the terminal to be used, which is priorly set as a fixed value.

As discussed with regard to the prior art as well, while the voltage detection means 2 can detect a voltage value over a wide range, this requiring a large power consumption, the voltage comparing means 2.1 is only capable of comparing with respect to a fixed value, but requires only a low power consumption.

Thus, by use in combination with the prior art, it is possible to effectively perform voltage comparison without having to constantly use the voltage detection means, which has a large power consumption.

As apparent from the above-mentioned explanation, the voltage detection means 2 may comprise a voltage detector 2.2 that operates only when there is the battery voltage detection request, and a first voltage comparing means 2.1 which compares the current voltage of the battery with a first predeterminedly set voltage.

Next, the fourth embodiment of the present invention will be described in detail.

Figure 5:
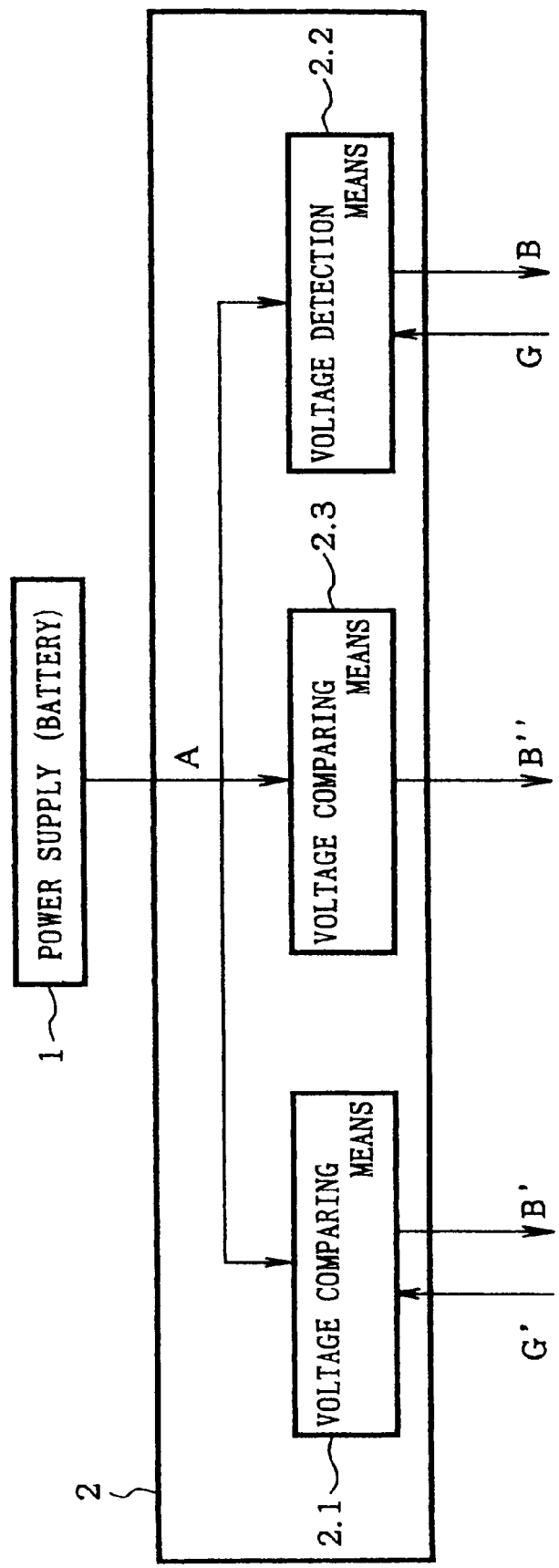
FIG. 5 is a drawing which shows a second example of the configuration of the voltage detection means of the present invention.

FIG. 5 shows a configuration in which voltage comparing means have been added to the previous embodiment of voltage detection means 2 which is shown in FIG. 4, two voltage comparing means being used.

This system is formed by a power supply one which is a portable supply such as a battery, a voltage comparing means 2.1 that operates only when a terminal is started and which is provided for the purpose of judging whether or not the remaining battery capacity is sufficient for starting of the terminal, a voltage comparing means 2.3 which is provided for the purpose of judging whether or not the remaining battery capacity has dropped to the point at which it is insufficient to operate a started terminal, and a voltage detection means 2.2 which is provided for the purpose of accurately calculating the remaining battery capacity.

The part 2 is formed by the voltage comparing means 2.1, the voltage comparing means 2.3, and the voltage detection means 2.2, this serving as the voltage detection means 2 which is shown in FIG. 2 and FIG. 3.

As apparent from the above-mentioned explanation, the voltage detection means 2 may further comprise a second voltage comparing means 2.3 which compares the current battery voltage with a second predeterminedly set voltage that is lower than the first predeterminedly set, and which in the case in which the current battery voltage is smaller than the second predeterminedly set voltage, switches the power to the portable terminal off.

Next, the operation of the system shown in FIG. 5 will be described.

As discussed with regard to the prior art and to the third embodiment of the present invention, because the voltage detection means 2 consumes a large amount of power, it is necessary to limit its use to the bare minimum required.

For this reason, when the terminal is started the voltage comparing means 2.1 is used to verify the amount of remaining battery capacity, this being the same as in the earlier described embodiment.

However, in a terminal which uses a battery as its power supply, it is necessary to know during use of the terminal when it is has lost it remaining capacity.

Additionally, to lengthen the time of use as much as possible, it is necessary to use the battery until it is almost completed depleted.

When using the battery until it is almost completely depleted, unless the terminal is switched off in a short period of time, the battery will be depleted, and stored data and programs will be destroyed.

For this reason, in the case in which the battery capacity is constantly monitored during operation, if the battery capacity is lost, it is necessary to have the voltage comparing means 2.3 for the purpose of switching the terminal power off immediately.

The voltage comparing means 2.3 only operates during normal terminal operation, and is not required to operate when the terminal power is switched off or when the terminal is started up.

As discussed also in the section about prior art, when the supply of power to a circuit is started, because of the delay in propagating the power supply, there is a temporary drop in the voltage.

For this reason, when the terminal is started a much larger electrical power is required than is required for normal terminal operation.

Thus, the reference voltages for comparison by the voltage comparing means 2.1 and the voltage comparing means 2.3 must be set differently.

The reference voltage for the voltage comparing means 2.1 for verifying the battery capacity at startup is set to a higher value than the reference voltage value for the voltage comparing means 2.3 for verifying the battery capacity for normal operation.

These values are characteristics values which depend upon the configuration of the terminal.

Next, the fifth embodiment of the present invention will be described in detail.

Figure 6:
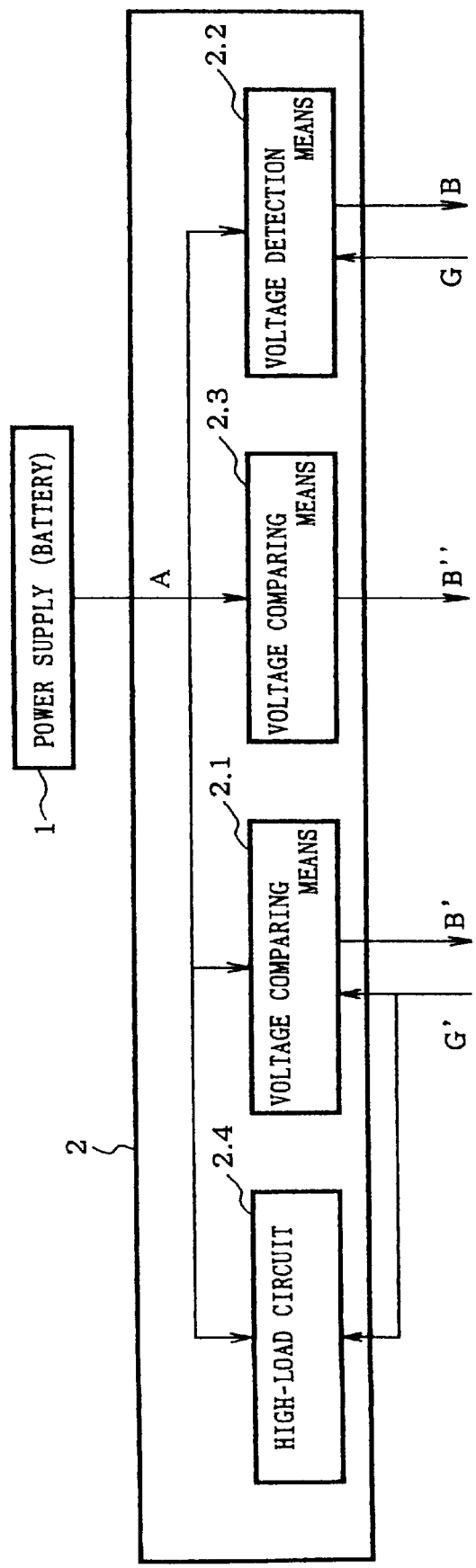
FIG. 6 is a drawing which shows a third example of the configuration of the voltage detection means of the present invention.

FIG. 6 shows a configuration in which a high load circuit 2.4 has been added to the configuration which was described as the fourth embodiment.

In this embodiment, the operation is similar to the earlier described fourth embodiment.

The added high load circuit 2.4 operates simultaneously with the voltage comparing means A 2.1.

In a battery which has a reduced amount of remaining capacity, although the voltage drops during application of a load, there is a tendency for the voltage to be restored temporarily to the normal supply voltage if the load is reduced.

If a battery in this condition is used to start a terminal, the voltage comparing means 2.1 which performs a judgment of the remaining battery capacity at startup will erroneously judge that the capacity is sufficient to start the terminal, resulting in starting of the terminal.

However, in the case of such a battery at the time of startup a high load is applied thereto, and the voltage drops because of the insufficient remaining capacity, the result is possible improper or runaway operation.

To prevent the above-noted situation, when making a judgment as to the remaining battery capacity at the time of terminal startup, power is also applied to the high-load circuit 2.4 for the purpose of intentionally applying a high load to the battery.

However, because of the large power consumption of the high-load circuit 2.4, it is operated for only a prescribed amount of time, only when making a judgment as to the remaining battery capacity at terminal startup, as is the case with the voltage comparing means 2.1.

For example, it can be connected to the battery only for a prescribed amount of time when judgment is made of the remaining battery capacity.

As mentioned above, the voltage detection means of the present invention may comprise a voltage detector 2.2 that operates only when there is the battery voltage detection request, and a high-load circuit 2.4 which is connected to the battery, and which operates only for a prescribed amount of time, when there exists the battery voltage detection request.

And more over, in the present invention, when the judgment result of the judging means is negative, the control means 3 displays the fact that execution of the drive request is not possible, through a suitable display means.

In another embodiment of the present invention, when the portable terminal 100 includes a plurality of peripheral circuit N and the power should be supplied each one of the peripheral circuits which is to be operated, the control means of the present invention may have a function whereby the control means supplies power to N peripheral circuits of the plurality of peripheral circuit corresponding to the drive request, one at time in sequence, and wherein before supplying power to the n-th peripheral circuit (where n is an integer no greater than N), a remaining battery capacity detection request is sent to the voltage detection means, and if a judgment result of the judging means is positive, whereby the battery is caused to supply power to the n-th peripheral circuit, thereby sequentially supplying power to the n peripheral circuits.

In another embodiment of the present invention, the control means is a control means which has a function to enable to supply power to N peripheral circuits of the plurality of peripheral circuit corresponding to the drive request, wherein the control means selectively supplies power to selected one or more of the peripheral circuits out of the N peripheral circuits of the plurality of peripheral circuit or stops power to any of the N peripheral circuits with respect to detected voltage level detected by the voltage detection means.

As apparent from the explanation as mentioned above, a method for controlling to execute a plurality of peripheral circuit used in a portable terminal having a battery, a plurality of peripheral circuits and a control means for individually controlling the supply of power to the peripheral circuits in response to an external drive request, the method comprises the steps of; detecting a voltage of the battery in response to a current battery voltage level detection request supplied from the control means in response to the drive request, calculating a remaining capacity of the battery based on the detected voltage, judging whether or not there is sufficient remaining capacity to satisfy the drive request, based upon the calculated remaining capacity of the battery, and supplying power to one or more than one of selected peripheral circuits each corresponding to the drive request when a result of the judgment is positive.

The other embodiment of the present invention, a method for controlling to execute a plurality of peripheral circuits as mentioned above, is further characterized in that, in a case when the power supply is controlled to supply the power to N peripheral circuits of the plurality of peripheral circuit corresponding to the drive request, one at time in sequence, whereby before supplying power to the n-th peripheral circuit (where n is an integer no greater than N), detecting a remaining battery capacity of the battery, judging whether or not a sufficient remaining battery capacity remains in the battery to enable to execute the n-th peripheral circuit, and supplying power to the n-th peripheral circuit if a judgment result is positive, thereby sequentially supplying power to the n peripheral circuits, respectively.

Figure 12:
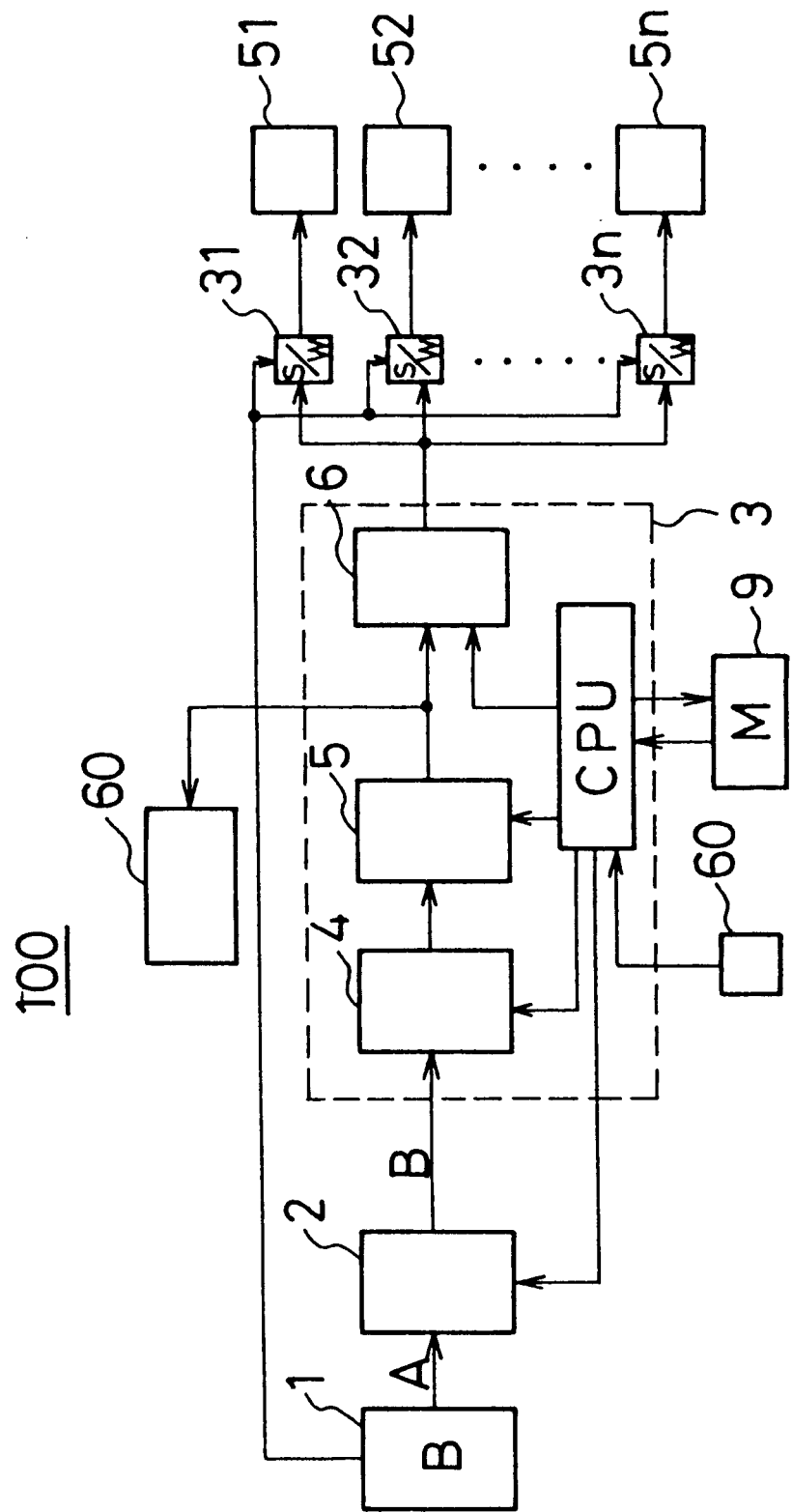
FIG. 12 shows a block-diagram showing another embodiment of the portable terminal of the present invention.

FIG. 12 shows a preferable embodiment of the portable terminal of the present invention.

According to this embodiment, the portable terminal 100 comprises a power supply 1, a voltage detection means 2 which detects the voltage and operates only when there is a voltage detection request, a remaining capacity calculating means 4 which calculates, from the voltage value B resulting from the voltage detection means 2, a judging means 5 which makes a judgment, from the results h of the remaining capacity calculating means 4, as to whether or not the application can be started, a switch means controlling means 6 which control each one of switching means 31, 32, - - - 3n each connected to the respective peripheral circuits 51, 52 - - - 5n, a total controlling means such as a CPU or the like 30 which controls each of the above-mentioned means, and a storage means 9 which stores data, programs, and the like.

Further, in the above-mentioned embodiment, a display means 60 which is connected to the judging means 5 and an operation signal input means 70 which can be operated by manually or through the transmission controlling means 7 and which is connected to the CPU 30.

On the other hand, the switch means controlling means 6 selectively switches a certain number of the switching means 31, 32, - - - 3n with respect to the judgment output from the judging means 5.

Further, each one of switching means 31, 32, - - - 3n is supplied the power from the battery 1.

More specifically, a method for controlling to execute a plurality of peripheral circuits as mentioned above, in a case in that the control means which has a function to enable to supply power to N peripheral circuits of the plurality of peripheral circuit corresponding to the drive request, the method comprising the steps of, detecting the voltage of the battery; and selectively supplying power to selected one or more of the peripheral circuits out of the N peripheral circuits of the plurality of peripheral circuit or stops power to any of the N peripheral circuits with respect to detected voltage.

The method for controlling to execute a plurality of peripheral circuit according to the present invention, the method comprises the steps of: detecting the voltage of the battery only when there is the battery voltage detection request, comparing the current voltage of the battery with a first predeterminedly set voltage, and controlling to execute the plurality of peripheral circuit corresponding to the drive request, with respect to either one of the detected voltage and the result of the comparison.

In the method for controlling to execute a plurality of peripheral circuit as explained above. The method further comprises the steps of: comparing the current voltage with a second predeterminedly set voltage that is lower than the first predeterminedly set; switching off the power to the peripheral circuit when the current battery voltage is smaller than the second predeterminedly set voltage.

More over, in the present invention, the method for controlling to execute a plurality of peripheral circuit further comprises the step of detecting the current voltage of the battery with a high-load circuit which is connected to the battery, when there exists the battery voltage detection request.

The first effect of the present invention is compactness and low cost, by means of an easily implemented circuit or program addition. The reason for this is the simple configuration, which is merely the addition of a voltage detection means, a remaining capacity calculating means, and a judging means.

The second effect of the present invention is prevention of destruction of a stored program or data, by preventing faulty operation when starting to supply power to a terminal peripheral circuit or when starting the terminal.

This effect is achieved by making a judgment as to whether or not the battery is capable of startup when starting to supply power to a peripheral circuit and when starting the terminal.

Even if a large number of peripheral circuits are used at the same time because they are supplied with power and started up one at a time, a drop in the voltage caused by simultaneous power application and startup is prevented.

The third effect achieved by the present invention is that of power savings by the addition of a low-cost, low-power-consumption voltage comparing means, and a reduction in the load on the information processing section.

This effect is achieved because the amount of remaining battery capacity required to start up a terminal is a fixed value dependent upon the terminal configuration, there being no need to know the precise voltage value, so that it is possible to make a comparison with respect to a fixed reference value that is pre-established.

It is also possible because, rather than verifying the amount of remaining battery capacity at startup time using the voltage detection means at all times, the judgment is made by a voltage comparing means as to whether or not there is sufficient remaining capacity for use of the terminal.

The fourth effect achieved by the present invention is the prevention of startup of the terminal in the case in which an attempt is made to start a terminal using a battery which has almost no remaining capacity but which has had a temporary voltage restoration, thereby preventing runaway operation of and destruction of a stored program of data due to a drop in voltage caused by the startup.

This effect is achieved by intentionally applying a high load to the battery when verifying the battery capacity at startup, thereby causing a voltage drop in a battery that has exhibited a temporary restoration of voltage, so that the terminal is not started.

What is claimed is:

1. A portable terminal adapted to be coupled to a battery for providing power thereto, said portable terminal comprising:

a plurality of peripheral circuits;

a control means for individually controlling the supply of power to said peripheral circuit and issuing a remaining battery capacity detection request in response to an external drive request;

a voltage detection means for detecting a voltage of said battery, including means for determining if said remaining battery capacity detection request has been issued, said voltage detection means only detecting a voltage of said battery in response to said remaining battery capacity detection request supplied from said control means in response to said drive request; and a judging means which judges the remaining capacity of said battery based on said voltage detected by said voltage detection means, and which further makes a judgment as to whether or not there is sufficient remaining capacity of said battery to satisfy said drive request, wherein when a judgment result of said judging means is that there is sufficient remaining capacity to satisfy said drive request, said control means causes said battery to supply power in response to said drive request.

2. A portable terminal according to claim 1, wherein said control means further comprises a remaining capacity calculating means for calculating a remaining capacity of said battery based on a voltage detected by said voltage detection means and a judging means which makes a judgment as to whether or not there is sufficient remaining capacity to satisfy said drive request, based upon data output from said remaining capacity calculating means.

3. A portable terminal according to claim 1, wherein said control means comprises a remaining capacity calculating means which calculates a remaining capacity of said battery from a voltage value resulting from the voltage detection means; a judging means which makes a judgment, from a result of said remaining capacity calculating means, as to whether or not an operation can be started; and an executing means which executes the operation.

4. A portable terminal according to claim 3, wherein said executing means comprises a switching controlling means for at least one switching means.

5. A portable terminal according to claim 1, wherein said control means which supplies power to N peripheral circuits of said plurality of peripheral circuits corresponding to said drive request, one at a time in sequence, whereby before supplying power to the n-th peripheral circuit, where n is an integer no greater than N, a remaining battery capacity detection request is sent to said voltage detection means, and if a judgment result of said judging means is that there is sufficient remaining capacity to satisfy said drive request, said battery is caused to supply power to the n-th peripheral circuit, thereby sequentially supplying power to the n peripheral circuits.

6. A portable terminal according to claim 1, wherein said control means has a function to enable power to be supplied to N peripheral circuits of said plurality of peripheral circuits corresponding to said drive request, wherein said control means selectively supplies power to a selected one or more of said peripheral circuits out of said N peripheral circuits of said plurality of peripheral circuits or stops power to any of said N peripheral circuits with respect to a detected voltage level detected by said voltage detection means.

7. A portable terminal according to claim 1 wherein said voltage detection means comprises a voltage detector that operates only when there is said battery voltage detection request, and a first voltage comparing means which compares a current voltage level of said battery with a first predetermined set voltage.

8. A portable terminal according to claim 7 wherein said voltage detection means further comprises a second voltage comparing means which compares said current voltage level of said battery with a second predetermined set voltage that is lower than said first predetermined set voltage and when said current voltage level of said battery is smaller than said second predetermined set voltage, switches power to said portable terminal off.

9. A portable terminal according to claim 1, wherein said voltage detection means comprises a voltage detector that operates only when there is said battery voltage detection request, and further comprising a high-load circuit which is connected to said battery, and which operates only for a prescribed amount of time when there exists said battery voltage detection request.

10. A portable terminal according to claim 1, wherein when a judgment result of said judging means is that there is insufficient remaining capacity to satisfy said drive request, said control means provides a display that execution of said drive request is not possible.

11. A method for controlling operation of a plurality of peripheral circuits used in a portable terminal, the portable terminal being adapted to be provided power from a battery, further wherein the terminal has a plurality of peripheral circuits and a control means for individually controlling the supply of power to said peripheral circuits in response to an external drive request, said method comprising the steps of:

detecting a voltage of said battery only in response to a current battery voltage level detection request supplied from said control means in response to said drive request;

calculating a remaining capacity of said battery based on said detected voltage;

judging whether or not there is sufficient remaining capacity to satisfy said drive request, based upon the calculated remaining capacity of said battery; and supplying power to one or more than one of said selected peripheral circuits each corresponding to said drive request when a result of said judgment is that there is sufficient remaining capacity to satisfy the drive request.

12. A method for controlling operation of a plurality of peripheral circuits according to claim 11, wherein when said power supply is controlled to supply power to N peripheral circuits of said plurality of peripheral circuits corresponding to said drive request, one at time in sequence, whereby before supplying power to the n-th peripheral circuit, where n is an integer no greater than N, the following steps are implemented: detecting a remaining battery capacity of said battery, judging whether or not a sufficient remaining battery capacity exists in said battery to enable operation of said n-th peripheral circuit, and supplying power to the n-the peripheral circuit if a judgment result is that there is sufficient remaining capacity to satisfy the drive request, thereby sequentially supplying power to the n peripheral circuits, respectively.

13. A method for controlling operation of a plurality of peripheral circuits according to claim 11, wherein said control means has a function to enable supply of power to N peripheral circuits of said plurality of peripheral circuits corresponding to said drive request, said method further comprising the steps of:

detecting the voltage of said battery; and selectively supplying power to a selected one or more of said peripheral circuits out of said N peripheral circuits of said plurality of peripheral circuits or stopping power to any of said N peripheral circuits with respect to the detected voltage.

14. A method for controlling operation of a plurality of peripheral circuits according to claim 11, wherein said method further comprises the steps of:

detecting the voltage of said battery only when there is said battery voltage detection request;

comparing a current voltage level of said battery with a first predetermined set voltage; and controlling operation of said plurality of peripheral circuits corresponding to said drive request, with respect to either one of said detected voltage and a result of the comparison.

15. A method for controlling operation of a plurality of peripheral circuits according to claim 14, wherein said method further comprises the steps of:

comparing said current voltage level with a second predetermined set voltage that is lower than said first predetermined set voltage;

switching off the power to said peripheral circuit when said current battery voltage is smaller than said second predetermined set voltage.

16. A method for controlling operation of a plurality of peripheral circuits according to claim 11, wherein said method further comprises the step of detecting a current voltage level of said battery with a high-load circuit which is connected to said battery, when there exists said battery voltage detection request.

17. A portable terminal adapted to be coupled to a battery for providing power thereto, said portable terminal comprising:

a plurality of peripheral circuits;

a control means for individually controlling a supply of power to said peripheral circuits response to a drive request, said control means supplying power to each of the plurality of peripheral circuits in a sequence in response to said drive request;

a voltage detection means for detecting a voltage of said battery only in response to a remaining battery capacity detection request supplied to said voltage detection means from said control means in response to said drive request; and a judging means which judges the remaining capacity of said battery based on said voltage detected by said voltage detection means, and which further makes a judgment as to whether or not there is sufficient remaining capacity of said battery to satisfy said drive request, wherein when a judgment result of said judging means is that there is sufficient remaining capacity to satisfy said drive request, said control means causes said battery to supply power in response to said drive request.

18. A portable terminal according to claim 1, wherein the judgment means determines whether there is enough electrical energy to supply current for an application if power is supplied to the circuit to be started.

19. A portable terminal according to claim 1, wherein the judgment means makes a comparison to a predetermined value for the circuit.

20. A method for controlling operation of a plurality of peripheral circuits according to claim 11, wherein the step of judging comprises making a comparison to a predetermined value for the circuit.

* * * * *